(12) United States Patent
Kuhlman

(10) Patent No.: US 6,286,910 B1
(45) Date of Patent: Sep. 11, 2001

(54) VEHICLE WHEEL ATTACHMENT SYSTEM

(76) Inventor: Kevin M. Kuhlman, 209 Crestview Dr., Arlington, TX (US) 76018

( * ) Notice: Subject to any disclaimer, the term of this patent is extended or adjusted under 35 U.S.C. 154(b) by 0 days.

(21) Appl. No.: 09/591,394

(22) Filed: Jun. 9, 2000

(51) Int. Cl.[7] .................................................. B60B 29/00
(52) U.S. Cl. .......................................... 301/111; 301/121
(58) Field of Search ................................... 301/111, 121, 301/120, 124.2, 6.1, 6.8, 35.61; 188/58, 218 XL; 192/97, 71, 93 C

(56) References Cited

U.S. PATENT DOCUMENTS

| D. 381,609 | 7/1997 | Ohata et al. . |
| 3,829,163 | 8/1974 | Hans . |
| 4,225,191 | 9/1980 | Knoski . |
| 4,477,121 | 10/1984 | Atkins . |
| 4,679,862 | * 7/1987 | Luo ................................ 301/124.2 X |
| 4,961,668 | 10/1990 | Trautmann . |
| 5,042,880 | 8/1991 | Garuti et al. . |
| 5,408,854 | * 4/1995 | Chiu ................................. 301/111 X |

* cited by examiner

Primary Examiner—D. Glenn Dayoan
Assistant Examiner—Patricia Engle

(57) ABSTRACT

A vehicle wheel attachment system for easily changing a tire. The vehicle wheel attachment system includes a rim, an attachment assembly and a rotor. The attachment assembly extends from a first side of the rim. The rotor has a central aperture that receives a distal portion of the attachment assembly therein when the first side of the rim is positioned to abut the rotor. The rotor has plurality of holes that extend into a wall of the central aperture of the rotor. The distal portion of the attachment assembly includes a plurality of rods that are selectively positioned between an extended position and a retracted position. Each of the rods is aligned with an associated one of the holes when the distal portion of the attachment assembly is inserted into the central aperture of the rotor. The rods are selectively extendable into the holes. Thus the distal end of the attachment assembly is coupled to the rotor such that rotation of the rotor rotates the rim.

11 Claims, 3 Drawing Sheets

US 6,286,910 B1

VEHICLE WHEEL ATTACHMENT SYSTEM

BACKGROUND OF THE INVENTION

1. Field of the Invention

The present invention relates to wheel changing devices and more particularly pertains to a new vehicle wheel attachment system for easily changing a tire.

2. Description of the Prior Art

The use of wheel changing devices is known in the prior art. More specifically, wheel changing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,042,880; U.S. Pat. No. 4,225,191; U.S. Pat. No. 4,477,121; U.S. Pat. No. 3,829,163; U.S. Pat. No. 4,961,668; and U.S. Pat. No. Des. 381,609.

While these devices fulfill their respective, particular objectives and requirements, the aforementioned patents do not disclose a new vehicle wheel attachment system. The inventive device includes a rim, an attachment assembly and a rotor. The attachment assembly extends from a first side of the rim. The rotor has a central aperture that receives a distal portion of the attachment assembly therein when the first side of the rim is positioned to abut the rotor. The rotor has plurality of holes that extend into a wall of the central aperture of the rotor. The distal portion of the attachment assembly includes a plurality of rods that are selectively positioned between an extended position and a retracted position. Each of the rods is aligned with an associated one of the holes when the distal portion of the attachment assembly is inserted into the central aperture of the rotor. The rods are selectively extendable into the holes. Thus the distal end of the attachment assembly is coupled to the rotor such that rotation of the rotor rotates the rim.

In these respects, the vehicle wheel attachment system according to the present invention substantially departs from the conventional concepts and designs of the prior art, and in so doing provides an apparatus primarily developed for the purpose of easily changing a tire.

SUMMARY OF THE INVENTION

In view of the foregoing disadvantages inherent in the known types of wheel changing devices now present in the prior art, the present invention provides a new vehicle wheel attachment system construction wherein the same can be utilized for easily changing a tire.

The general purpose of the present invention, which will be described subsequently in greater detail, is to provide a new vehicle wheel attachment system apparatus and method which has many of the advantages of the wheel changing devices mentioned heretofore and many novel features that result in a new vehicle wheel attachment system which is not anticipated, rendered obvious, suggested, or even implied by any of the prior art wheel changing devices, either alone or in any combination thereof.

To attain this, the present invention generally comprises a rim, an attachment assembly and a rotor. The attachment assembly extends from a first side of the rim. The rotor has a central aperture that receives a distal portion of the attachment assembly therein when the first side of the rim is positioned to abut the rotor. The rotor has plurality of holes that extend into a wall of the central aperture of the rotor. The distal portion of the attachment assembly includes a plurality of rods that are selectively positioned between an extended position and a retracted position. Each of the rods is aligned with an associated one of the holes when the distal portion of the attachment assembly is inserted into the central aperture of the rotor. The rods are selectively extendable into the holes. Thus the distal end of the attachment assembly is coupled to the rotor such that rotation of the rotor rotates the rim.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is another object of the present invention to provide a new vehicle wheel attachment system that may be easily and efficiently manufactured and marketed.

It is a further object of the present invention to provide a new vehicle wheel attachment system that is of a durable and reliable construction.

An even further object of the present invention is to provide a new vehicle wheel attachment system which is susceptible of a low cost of manufacture with regard to both materials and labor, and which accordingly is then susceptible of low prices of sale to the consuming public, thereby making such vehicle wheel attachment system economically available to the buying public.

Still yet another object of the present invention is to provide a new vehicle wheel attachment system which provides in the apparatuses and methods of the prior art some of the advantages thereof, while simultaneously overcoming some of the disadvantages normally associated therewith.

Still another object of the present invention is to provide a new vehicle wheel attachment system for easily changing a tire.

Yet another object of the present invention is to provide a new vehicle wheel attachment system which includes a rim, an attachment assembly and a rotor. The attachment assembly extends from a first side of the rim. The rotor has a central aperture that receives a distal portion of the attachment assembly therein when the first side of the rim is positioned to abut the rotor. The rotor has plurality of holes that extend into a wall of the central aperture of the rotor. The distal portion of the attachment assembly includes a plurality of rods that are selectively positioned between an extended position and a retracted position. Each of the rods is aligned with an associated one of the holes when the distal portion of the attachment assembly is inserted into the central aperture of the rotor. The rods are selectively extendable into the holes. Thus the distal end of the attachment assembly is coupled to the rotor such that rotation of the rotor rotates the rim.

Still yet another object of the present invention is to provide a new vehicle wheel attachment system that allows a tire to be changed quickly.

Even still another object of the present invention is to provide a new vehicle wheel attachment system that will prevent the tire and rim from being stolen.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
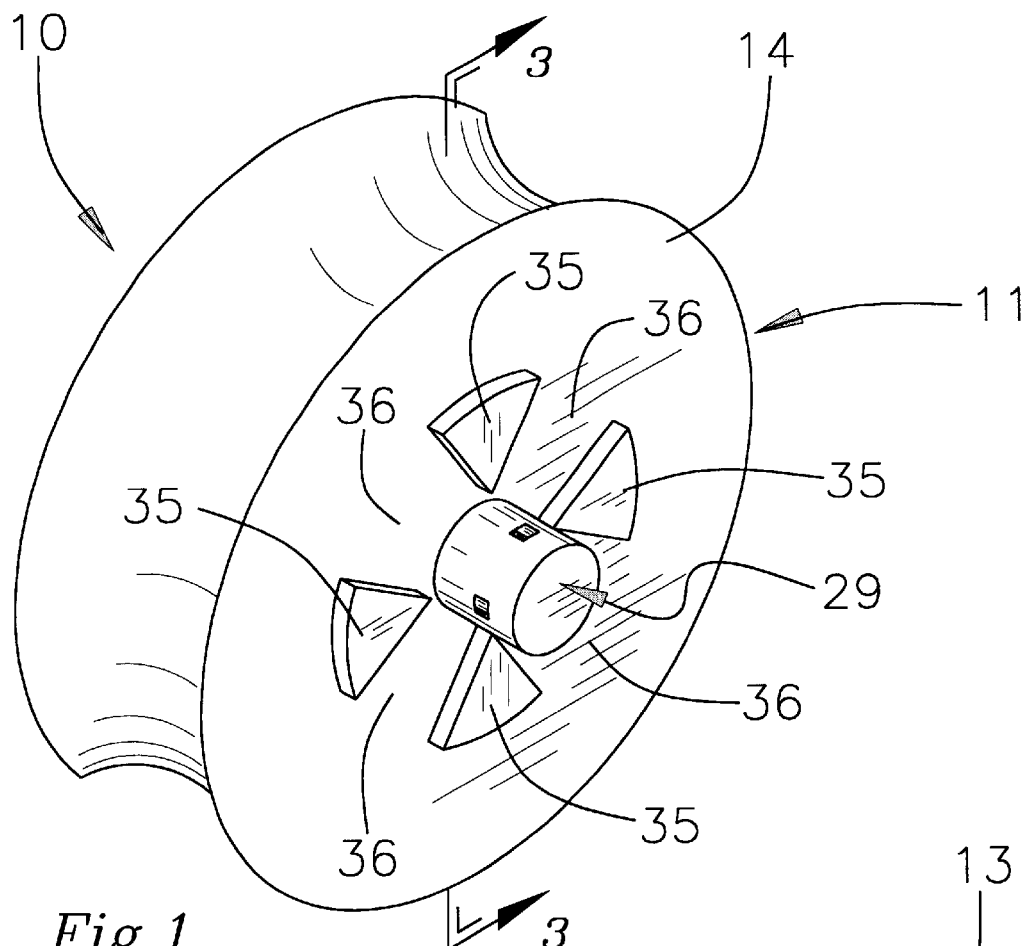
FIG. 1 is a schematic perspective view of a new vehicle wheel attachment system according to the present invention.
Figure 2:
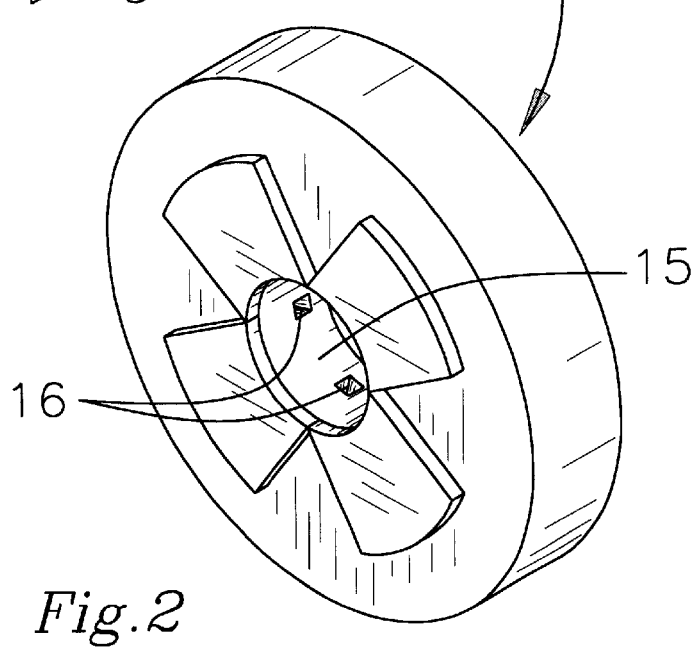
FIG. 2 is a schematic perspective view of the rotor of the present invention.
Figures 3, 4:
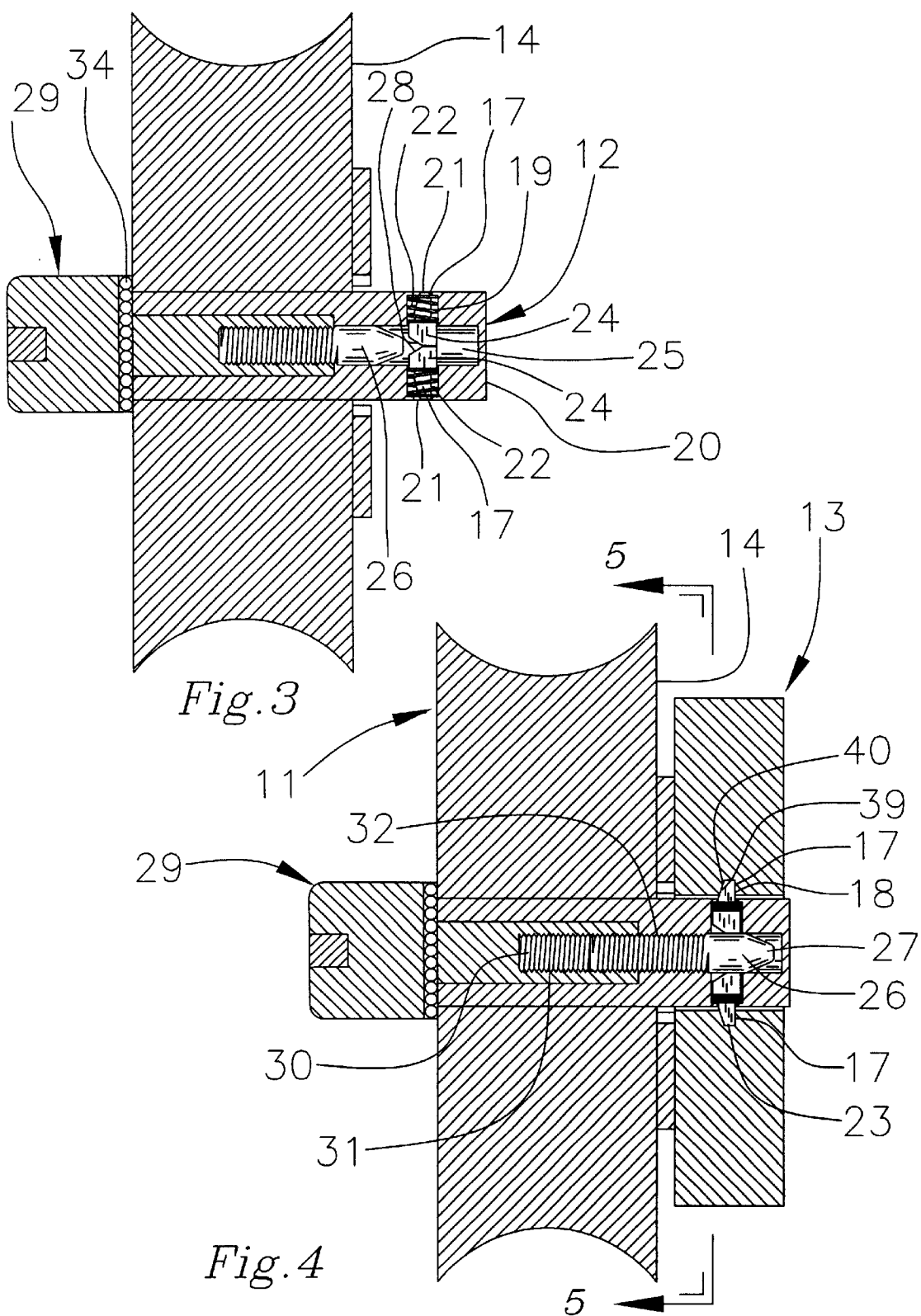
FIG. 3 is a schematic cross-sectional side view of the rim and attachment assembly of the present invention.
FIG. 4 is a schematic cross-sectional view side of the present invention.
Figure 5:
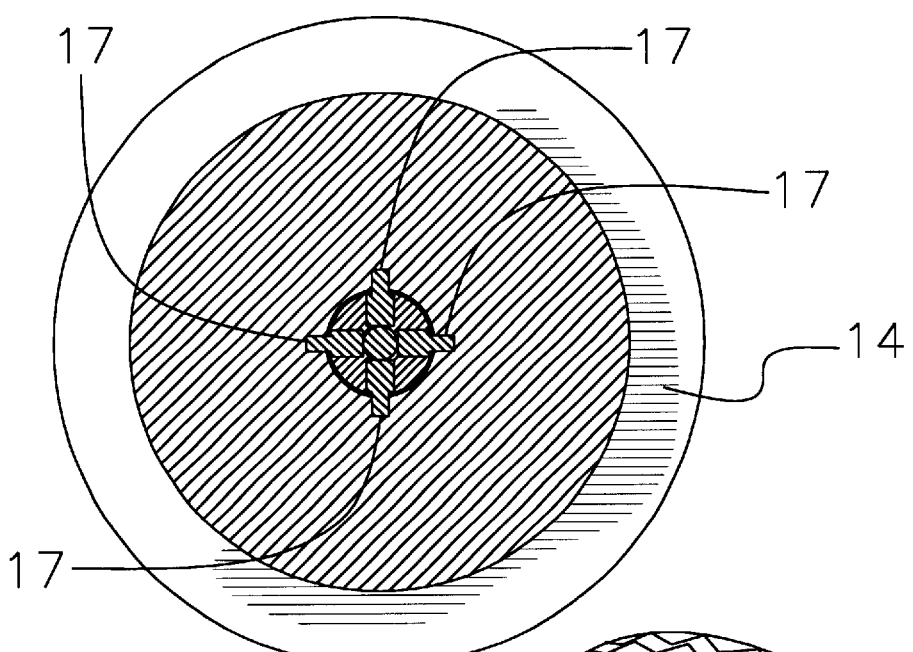
FIG. 5 is a schematic cross sectional back view of the present invention.
Figure 6:
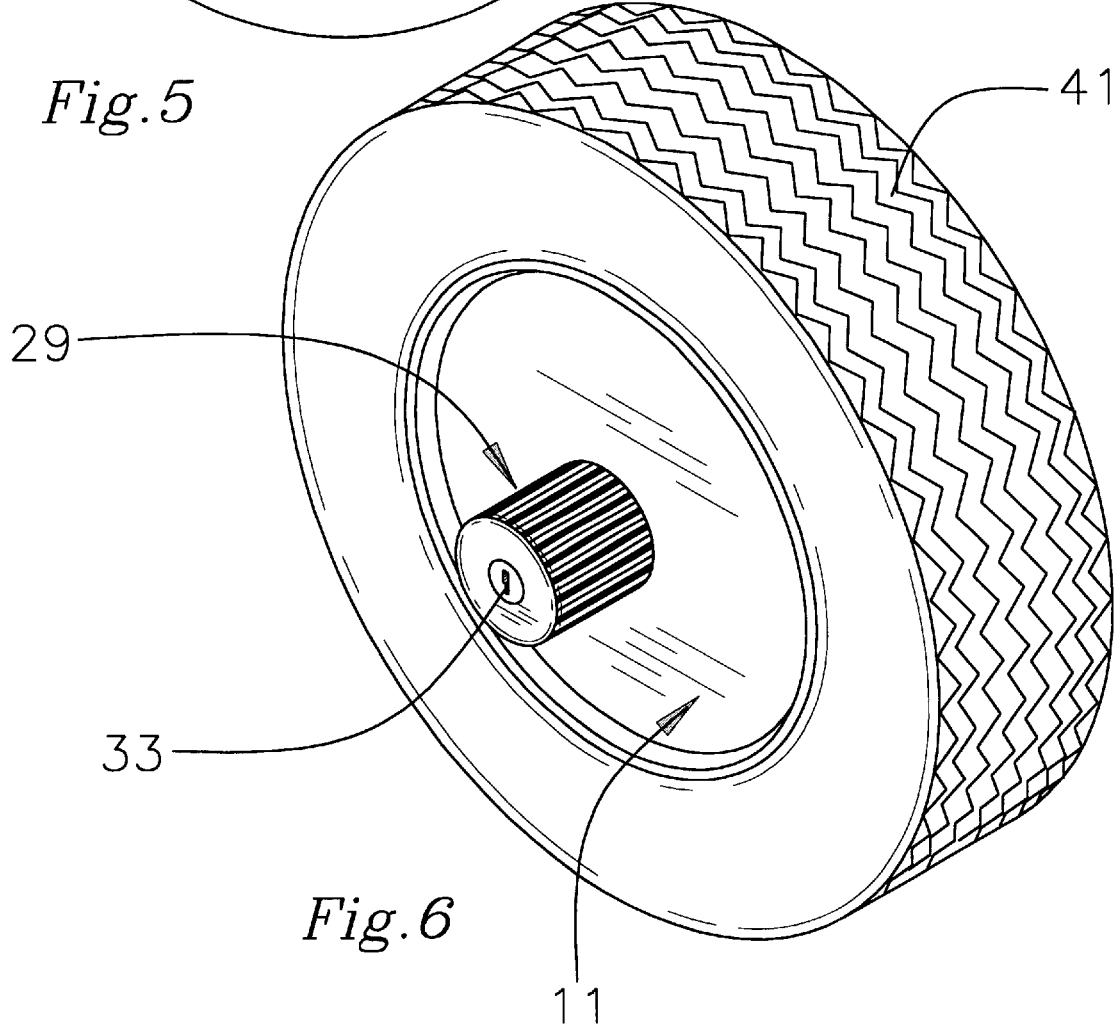
FIG. 6 is a schematic perspective view of the present invention.

With reference now to the drawings, and in particular to FIGS. 1 through 6 thereof, a new vehicle wheel attachment system embodying the principles and concepts of the present invention and generally designated by the reference numeral 10 will be described.

As best illustrated in FIGS. 1 through 6, the vehicle wheel attachment system 10 generally comprises a rim 11, an attachment assembly 12 and a rotor 13. The attachment assembly 12 extends from a first side 14 of the rim 11.

The rotor 13 is designed for turning the rim 11 when the rim 11 is engaged to the rotor 13. The rotor 13 has a central aperture 15. The central aperture 15 receives a distal portion 20 of the attachment assembly 12 when the first side 14 of the rim 11 is positioned to abut the rotor 13. The rotor 13 is configured to include a plurality of holes 16 that extend into a wall of the central aperture 15 of the rotor 13.

The attachment assembly 12 includes a plurality of rods 17. The plurality of rods 17 are selectively positioned between an extended position 18 and a retracted position 19. The extended position 18 is defined when each of the rods 17 extend radially outward from the distal portion 20 of the attachment assembly 12. The retracted position 19 is defined when each of the rods 17 are positioned fully within an associated rod chamber 21. When the rods 17 are in the retracted position, the distal portion 20 of the attachment assembly 12 may be inserted into the central aperture 15 of the rotor 13.

When the distal portion 20 of the attachment assembly 12 is inserted into the central aperture 15 each of the rods 17 of the attachment assembly 12 are aligned with an associated one of the holes 16 in the central aperture 15 of the rotor 13. The rods 17 are designed to selectively extend into the holes 16. Thus the distal end 20 of the attachment assembly 12 may be coupled to the rotor 13 such that rotation of the rotor 13 rotates the rim 11.

A plurality of biasing members 22 are positioned in an associated one of the rod chambers 21. Each of the biasing members 22 are coupled to an associated one of the rods 17 in a manner such that the biasing member 22 biases the associated rod 17 into the retracted position 19.

Each of the rods 17 includes an end portion 23 and a head portion 24. The head portion 24 is positioned in a central duct 25. The central duct 25 extends longitudinally through the attachment assembly 12 when the rods 17 are in the retracted position 19. A piston 26 is positioned in the central duct 25. The piston 26 is selectively extendable towards the head portions 24 of the rod 17. The piston 26 has a generally cone-shaped nose portion 27. Each head portion 24 of each rod 17 includes an angled wall 28. Each angled wall 28 is positioned to face the piston 26. This configuration ensures that the rods 17 are urged outward into their extended position 18 as the piston 26 is extended towards the rods 17.

Each of the rods 17 has an angled face 39. The angled face extends from the end of each of the rods 17 that is inserted into an associated hole 16 in the central aperture 15 in the rotor 13. Each hole 16 has an angled bearing wall 40 for abutting the angled face 39 of the associated rod 17. Thus the first side 14 of the rim is urged towards the rotor 13 when the rods 17 are urged outward into the holes 16 in the rotor 13.

The attachment assembly 12 includes a hub member 29. The hub member extends outward from the rim 11 opposite the distal end 20 of the attachment assembly 12. The hub member 29 includes a piston engagement portion 30. The piston engagement portion 30 has an inwardly threaded wall 31. The piston 26 includes an outwardly threaded portion 32. The outwardly threaded portion 32 of the piston 26 is threadedly engaged to the inwardly threaded wall 31 of the piston engagement portion 30. Thus rotation of the hub member 29 selectively moves the piston 26 in the central duct 25.

The hub member 29 also includes a locking assembly 33. The locking assembly 33 prevents rotation of the hub member 29. Thus the piston 26 may be locked into a static position relative to the rods 17. This allows the rods 17 to be held in the extended position 18 or the retracted position 19. In addition, the hub member 29 has a plurality of ball bearings 34 for facilitating rotation of the hub member 29.

The rim 11 includes a plurality of rim connection members 35 that extend outward from the rim 11 and a plurality of rim depressions 36. Each of the rim depressions 36 are positioned between an associated adjacent pair of the rim connection members 35. The rotor 13 includes a plurality of rotor connection members 37 that extend outward from the rotor 13 and a plurality of rotor depressions 38. Each of the rotor depressions 38 are positioned between an associated adjacent pair of the rotor connection members 37.

Each of the rim connection members 35 are matingly engaged to an associated one of the rotor depressions 38 when the rods 17 are inserted into the holes 16. Likewise, each of the rotor connection members 37 are matingly engaged to an associated one of the rim depressions 36 when the rods 17 are inserted into the holes 16. This configuration facilitates rotation of the rim 11 when the rotor 13 rotates.

In use, a tire 41 may be replaced by first unlocking the locking assembly 33. The hub member 29 may then be rotated in a counter clockwise direction. This rotation disengages the piston 26 from the rods 17. Once the piston 26 is disengaged from the rods 17, the biasing members 22 force the rods 17 into their retracted position 19 thereby disengaging the attachment assembly 12 from the rotor 13. The tire 41, rim 11 and attachment assembly 12 may then be removed from the rotor 13.

In replacing the tire 41, rim 11 and attachment assembly 12, the distal end 20 of the attachment assembly 12 is inserted in the central opening 15 in the rotor 13. The hub member 29 is then rotated clockwise. This rotation engages the piston 26 with the rods 17 thereby forcing the rods 17 into the holes 16 in the rotor 13. Thus the tire 41, rim 11 and attachment assembly 12 are secured to the rotor 13. The attachment assembly 12 may then be lock in place by the locking assembly 33 to prevent the tire 41, rim 11 and attachment assembly 12 from being stolen and preventing unwanted rotation of the hub member 29.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle wheel attachment system comprising:

a rim;

an attachment assembly extending from a first side of the rim;

a rotor adapted for turning said rim when said rim is engaged with said rotor;

said rotor having a central aperture for receiving a distal portion of said attachment assembly therein when said first side of said rim is positioned to abut said rotor;

said rotor being configured to include a plurality of holes extending into a wall of said central aperture of said rotor;

said attachment assembly including a plurality of rods selectively positionable between an extended position defined by each of said rods extending radially outward from said distal portion of said attachment assembly and a retracted position defined by each of said rods being positioned fully within an associated rod chamber such that said distal portion of said attachment assembly is insertable into said central aperture of said rotor;

each of said rods being alignable with an associated one of said holes when said distal portion of said attachment assembly is inserted into said central aperture of said rotor whereby said rods are selectively extendable into said holes whereby said distal end of said attachment assembly is coupled to said rotor such that rotation of said rotor rotates said rim.

2. The vehicle wheel attachment assembly of claim 1, further comprising:

a plurality of biasing members, each biasing member being positioned in an associated one of said rod chambers, each of said biasing members being coupled to an associated one of said rods such that said biasing member biases said associated rod into said retracted position.

3. The vehicle wheel attachment assembly of claim 2, further comprising:

each of said rods including an end portion and a head portion, said head portion being positioned in a central duct extending longitudinally through said attachment assembly when said rods are in said retracted position;

a piston positioned in said central duct, said piston being selectively extendable towards said head portions of said rods;

said piston having a generally cone-shaped nose portion; and each head portion including an angled wall, each said angled wall being positioned to face said piston whereby said nose portion of said piston contacts said angled wall whereby said rods are urged outwardly into said extended position as said piston is extended towards said rods.

4. The vehicle wheel attachment assembly of claim 3, further comprising:

said attachment assembly including a hub member extending outwardly from said rim opposite said distal end of said attachment assembly, said hub member including a piston engagement portion, said piston engagement portion having an inwardly threaded wall;

said piston including an outwardly threaded portion, said outwardly threaded portion being threadedly engaged to said inwardly threaded wall of said piston engagement portion whereby rotation of said hub member selectively moves said piston in said central duct.

5. The vehicle wheel attachment assembly of claim 4, further comprising:

said hub member including a locking assembly for preventing rotation of said hub member whereby said piston is lockable into a static position relative to said rods for holding said rods in a selectable one of said extended position and said retracted position.

6. The vehicle wheel attachment assembly of claim 4, further comprising:

said hub member including a plurality of ball bearings for facilitating rotation of said hub member.

7. The vehicle wheel attachment assembly of claim 1, further comprising:

said rim including a plurality of rim connection members extending outwardly from said rim;

said rotor including a plurality of rotor depressions extending inwardly from an outermost face of said rotor;

each of said rim connection members being matingly engageable to an associated one of said rotor depressions when said rods are inserted into said holes for facilitating rotation of said rim when said rotor rotates.

8. The vehicle wheel attachment assembly of claim 1, further comprising:

said rim including a plurality of rim depressions extending inwardly from an outermost face of said first side of said rim;

said rotor including a plurality of rotor connection members extending outwardly from said rotor;

each of said rotor connection members being matingly engageable to an associated one of said rim depressions when said rods are inserted into said holes for facilitating rotation of said rim when said rotor rotates.

9. The vehicle wheel attachment assembly of claim 1, further comprising:

said rim including a plurality of rim connection members extending outwardly from said rim and a plurality of rim depressions, each of said rim depressions being positioned between an associated adjacent pair of said rim connection members;

said rotor including a plurality of rotor connection members extending outwardly from said rotor a plurality of rotor depressions, each of said rotor depressions being positioned between an associated adjacent pair of said rotor connection members;

each of said rim connection members being matingly engageable to an associated one of said rotor depressions when said rods are inserted into said holes for facilitating rotation of said rim when said rotor rotates; and each of said rotor connection members being matingly engageable to an associated one of said rim depressions when said rods are inserted into said holes for facilitating rotation of said rim when said rotor rotates.

10. The vehicle wheel attachment assembly of claim 9, further comprising:

each of said rods having an angled face extending from an end of said rod insertable into said associated hole; and each hole having an angled bearing wall for abutting said angled face of said associated rod whereby said first side of said rim is urged towards said rotor when said rods are inserted into said holes.

11. A vehicle wheel attachment system comprising:

a rim;

an attachment assembly extending from a first side of the rim;

a rotor adapted for turning said rim when said rim is engaged with said rotor;

said rotor having a central aperture for receiving a distal portion of said attachment assembly therein when said first side of said rim is positioned to abut said rotor;

said rotor being configured to include a plurality of holes extending into a wall of said central aperture of said rotor;

said attachment assembly including a plurality of rods selectively positionable between an extended position defined by each of said rods extending radially outward from said distal portion of said attachment assembly and a retracted position defined by each of said rods being positioned fully within an associated rod chamber such that said distal portion of said attachment assembly is insertable into said central aperture of said rotor;

each of said rods being alignable with an associated one of said holes when said distal portion of said attachment assembly is inserted into said central aperture of said rotor whereby said rods are selectively extendable into said holes whereby said distal end of said attachment assembly is coupled to said rotor such that rotation of said rotor rotates said rim;

a plurality of biasing members, each biasing member being positioned in an associated one of said rod chambers, each of said biasing members being coupled to an associated one of said rods such that said biasing member biases said associated rod into said retracted position;

each of said rods including an end portion and a head portion, said head portion being positioned in a central duct extending longitudinally through said attachment assembly when said rods are in said retracted position;

a piston positioned in said central duct, said piston being selectively extendable towards said head portions of said rods;

said piston having a generally cone-shaped nose portion; and each head portion including an angled wall, each said angled wall being positioned to face said piston whereby said nose portion of said piston contacts said angled wall whereby said rods are urged outwardly into said extended position as said piston is extended towards said rods;

said attachment assembly including a hub member extending outwardly from said rim opposite said distal end of said attachment assembly, said hub member including a piston engagement portion, said piston engagement portion having an inwardly threaded wall;

said piston including an outwardly threaded portion, said outwardly threaded portion being threadedly engaged to said inwardly threaded wall of said piston engagement portion whereby rotation of said hub member selectively moves said piston in said central duct;

said hub member including a locking assembly for preventing rotation of said hub member whereby said piston is lockable into a static position relative to said rods for holding said rods in a selectable one of said extended position and said retracted position;

said hub member including a plurality of ball bearings for facilitating rotation of said hub member;

said rim including a plurality of rim connection members extending outwardly from said rim and a plurality of rim depressions, each of said rim depressions being positioned between an associated adjacent pair of said rim connection members;

said rotor including a plurality of rotor connection members extending outwardly from said rotor a plurality of rotor depressions, each of said rotor depressions being positioned between an associated adjacent pair of said rotor connection members;

each of said rods having an angled face extending from an end of said rod insertable into said associated hole;

each hole having an angled bearing wall for abutting said angled face of said associated rod whereby said first side of said rim is urged towards said rotor when said rods are inserted into said holes;

each of said rim connection members being matingly engageable to an associated one of said rotor depressions when said rods are inserted into said holes for facilitating rotation of said rim when said rotor rotates; and each of said rotor connection members being matingly engageable to an associated one of said rim depressions when said rods are inserted into said holes for facilitating rotation of said rim when said rotor rotates.

* * * * *